Dec. 27, 1949  E. A. HOLLOWELL  2,492,152
PLANT POT ASSEMBLY
Original Filed Feb. 23, 1945

Inventor
E. A. HOLLOWELL

By
ATTORNEYS

Patented Dec. 27, 1949

2,492,152

UNITED STATES PATENT OFFICE 2,492,152

PLANT POT ASSEMBLY

Eugene A. Hollowell, Takoma Park, Md.

Original application February 23, 1945, Serial No. 579,476. Divided and this application June 12, 1947, Serial No. 754,258

2 Claims. (Cl. 47—38)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This application is a division of my copending application, Serial No. 579,476, filed February 23, 1945, now abandoned.

This invention relates to plant pot assemblies and has among its objects the provision of such assemblies which will afford suitable protection against dehydrating and waterlogging of plants.

Commercial porous plant pots, when used for the growing of plants in the home and in other places having a dry atmosphere, have two main disadvantages. First, the rapid loss of moisture through the wall of the pot is conducive to the drying of the soil next to the interior surface of the pot, thus creating an unfavorable soil condition for plant growth and survival. Secondly, when potted plants are placed into containers having water therein, overwatering is liable to occur, thus causing a waterlogged condition of the soil. Such a condition is also unfavorable for plant growth and frequently causes the early death of the plant. This invention avoids these undesirable conditions and provides instead a humid atmosphere surrounding the plant pot.

According to the invention, a plant pot assembly is provided which comprises an open-top container having an imperforate wall and a plant pot having a porous wall and a flange near the upper portion thereof, the plant pot being supported inside the container with its wall spaced from the wall of the container and in such a manner that the bottom of the plant pot is positioned a substantial distance above the bottom of the container, the space being reserved inside the container below the bottom of said plant pot for the accumulation of water. By this positioning of the plant pot, waterlogging is avoided, since the bottom of the plant pot does not contact the water at the bottom of the container. In addition to this feature, a removable seal is provided between the upper portion of the plant pot and the container which has the effect of causing the constant maintenance of humid atmospheric conditions around the plant pot, thus preventing drying of the soil in the plant pot.

Figure 1:
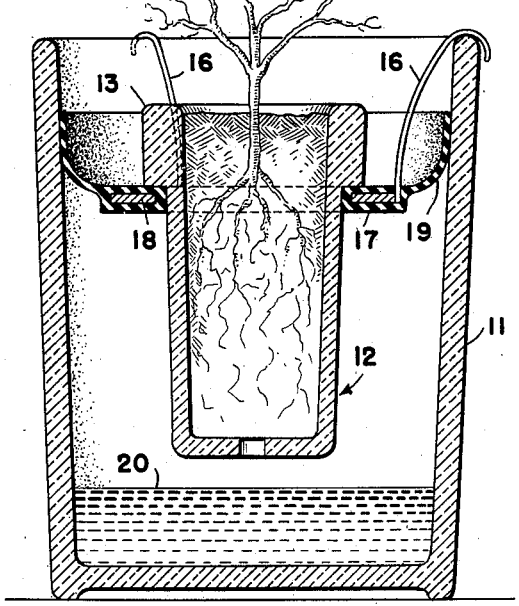
Figure 2:
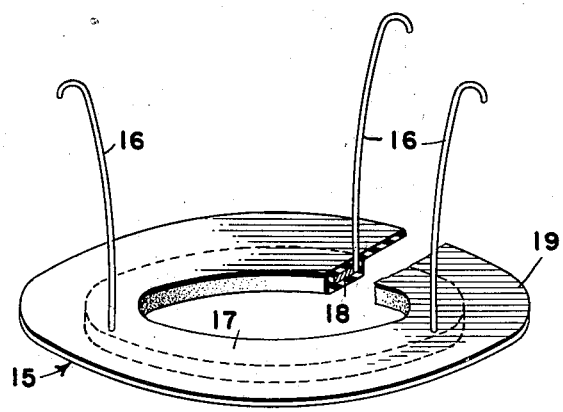

In the accompanying drawing,

Figure 1 is an embodiment of the invention and illustrates a longitudinal section of a container and a removable seal, in the form of a washer, properly positioned therein; and Figure 2 is a three-dimensional view of the removable seal shown in Figure 1.

Referring with more particularity to the drawing, the plant pot assembly comprises an ordinary open-top container 11 having an imperforate wall and constructed of pottery, glass, metal, or other materials, a plant pot 12 having a porous wall and a flange 13 integrally mounted on the exterior surface of and near the upper portion of the plant pot, and a removable seal shown separately as Figure 2.

The removable seal, which is removably mounted within container 11, comprises a washer 15 and a series of spaced malleable supporting clips 16. Washer 15 is composed of a rigid inner ring 17, in the form of a metallic washer 18 imbedded in rubber, and a flexible outer ring 19, the outer periphery of inner ring 17 being attached to and having sealing engagement with the inner periphery of outer ring 19. The spaced malleable supporting clips 16 are each rigidly attached at one end to metallic washer 18 of inner ring 17 while the other end is shaped and adjusted to fit over the open top of container 11 thus supporting washer 15 which, in turn, supports the plant pot as shown in Figure 1.

It is preferred that washer 15, when supporting plant pot 12, be of sufficient distance from the open end of container 11 so as to obscure the top of the plant pot from view. This has the effect of creating a more pleasing appearance of the assembly than if the top of the plant pot were exposed. Also, washer 15 should be of sufficient distance from the bottom of container 11 so that when plant pot 12 is properly positioned thereon, the bottom of the plant pot will be above the bottom of the container with sufficient space reserved inside the container below the bottom of said plant pot for the accumulation of water 20. It is important that the bottom of the plant pot does not contact the water, otherwise waterlogging will occur.

When the elements are properly positioned and the water placed in its reserved space out of contact with the bottom of the plant pot, as shown in Figure 1, the upper surface of inner ring 17 has sealing engagement with the lower surface of flange 13 of the plant pot. Additional sealing effect is obtained where the outer portion of outer ring 19 contacts the interior surface of the wall of container 11. The resultant effect is the constant maintenance of humid atmospheric conditions around the plant pot.

Having thus described the invention, I claim:

1. A plant pot assembly comprising an open-top container having an imperforate wall, a plant pot having a porous wall and a flange near the upper portion thereof, said plant pot being supported inside the container with its wall spaced from the wall of the container and with the bottom of the plant pot positioned a substantial distance above the bottom of the container to provide a space inside the container below the bottom of the plant pot for the accumulation of water thereby to keep said bottom of the plant pot always out of contact with the level of the accumulated water, and a removable seal in the form of a washer supported by spaced supporting clips, said washer having a rigid inner ring and a flexible outer ring, the outer periphery of said inner ring having sealing engagement with the inner periphery of said outer ring, each of said supporting clips being rigidly secured at one end to the rigid inner ring while the other end is shaped to fit over the top of the container thus to support said washer and said plant pot, said inner ring on its upper surface having sealing engagement with the lower surface of the flange of the plant pot and also supporting said plant pot while the outer portion of said outer ring contacts the interior surface of the wall of the container to provide additional sealing effect, whereby a humid atmosphere favorable for plant growth and survival is constantly maintained around the plant pot.

2. A removable seal for use in supporting a plant pot having a porous wall when it is placed into a container having an imperforate wall, comprising a washer and spaced supporting clips, said washer having a rigid inner ring and a flexible outer ring, the outer periphery of said inner ring being attached to and having sealing engagement with the inner periphery of said outer ring, said supporting clips each having one end rigidly attached to the inner ring while the other end is shaped to fit over the top of the container.

EUGENE A. HOLLOWELL.

REFERENCES CITED

The following references are of record in the file of this patent:

UNITED STATES PATENTS

| Number | Name | Date |
|---|---|---|
| 616,968 | Price | Jan. 3, 1899 |

FOREIGN PATENTS

| Number | Country | Date |
|---|---|---|
| 39,724 | Netherlands | Nov. 17, 1936 |